United States Patent Office 3,495,160
Patented Feb. 10, 1970

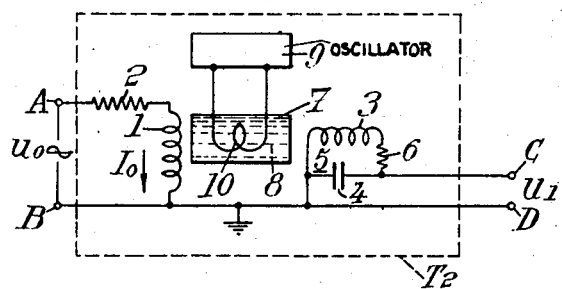
Fig. 1.
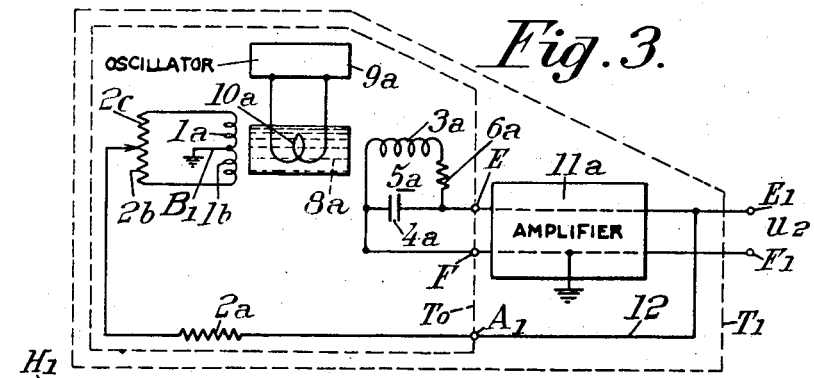
Fig. 3.
Fig. 4.
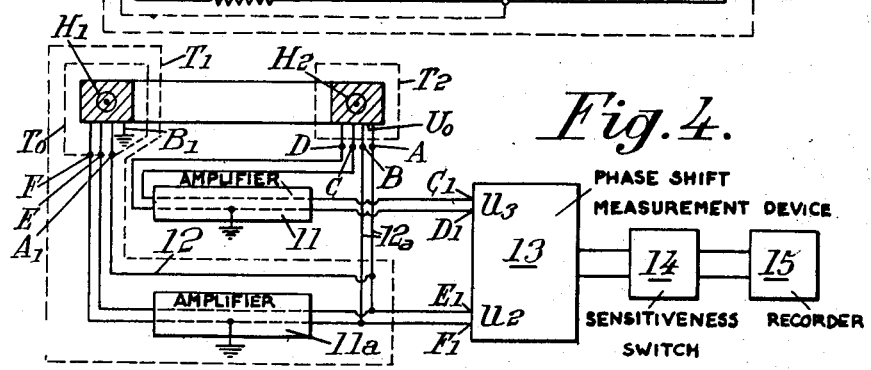
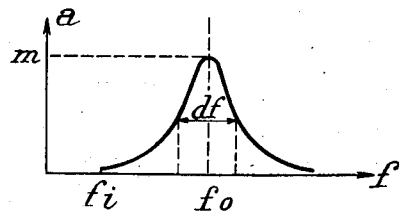
Fig. 2.

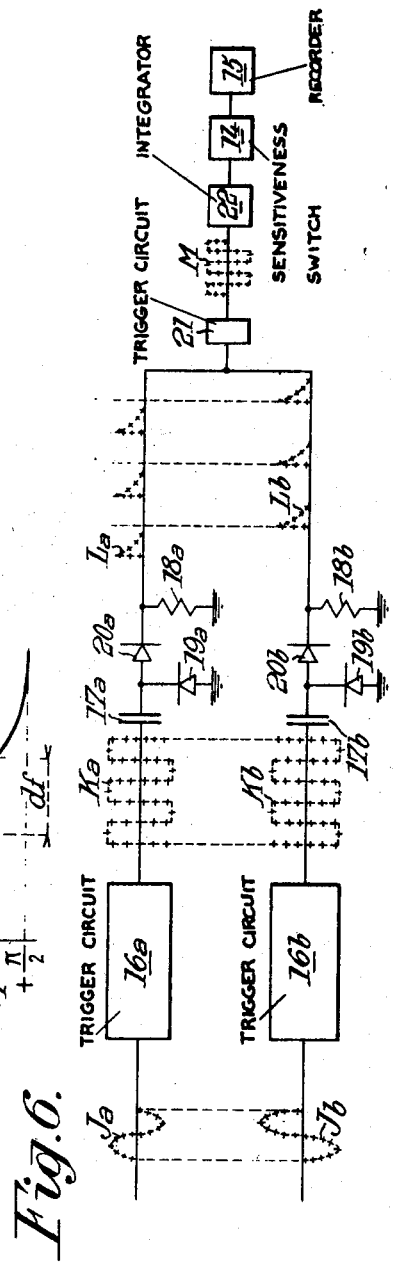

3,495,160
MAGNETIC RESONANCE DEVICE FOR MEASURING MAGNETIC FIELD GRADIENTS
Paul Raffini, La Tronche, Francis Roback, Grenoble, and Antoine Salvi, Fontaine, France, assignors to Commissariat a l'Energie Atomique, Paris, France
Filed Feb. 3, 1967, Ser. No. 613,869
Claims priority, application France, Feb. 4, 1966, 48,470
Int. Cl. G01r 33/08; G01n 27/00
U.S. Cl. 324—0.5                                   1 Claim

ABSTRACT OF THE DISCLOSURE

The grandiometer comprises a spin oscillator delivering a voltage of a frequency proportional to the field value in a first area and a portion of which is injected into a nuclear filter which delivers a voltage the amplitude of which varies, as a function of the input frequency, according to a resonance curve centered on a frequency proportional to the field value in a second area, and means for determining the phase shift between the voltage at the output of the spin voltage oscillator and the suitably amplified voltage at the output of the nuclear filter, this difference being proportional to the difference of the field values in said respective areas.

---

The present invention relates to magnetic gradiometers, i.e. devices for measuring magnetic field gradients. It is more especially but not exclusively concerned with devices for measuring the variations of the earth magnetic field intensity for prospecting purposes which permit compensation of the "permanent" parasitic magnetic fields on board an aircraft or other vehicle carrying the magnetic field measurement device.

The chief object of this invention is to provide a gradiometer which is more accurate and more precise in magnetic field gradient measurements, has a lower electric consumption and is stronger than known existing devices for the same purpose.

A magnetic gradiometer according to the present invention for measuring the difference between the magnetic field intensities in a first and second area, respectively, comprises, in combination: a first magnetometer head located in said first area for supplying a first substantially sinusoidal electromotive force of a frequency proportional to the magnetic field intensity in said first area; a second magnetometer head located in said second area forming a nuclear filter which delivers at its output, in response to an input sinusoidal signal of variable frequency, a second electromotive force the amplitude of which varies, as a function of the frequency of the input signal, in accordance with a resonance of Lorentz curve centered on its resonance frequency, this resonance frequency being proportional to the intensity of the magnetic field in said second area; means for injecting a portion of said first electromotive force from said first magnetic head into the input of said second head where it constitutes said input signal; and means for determining the phase shift between the first and the second electromotive forces, this phase shift being proportional to the difference between the magnetic field respective intensities in said first and second areas.

According to a first embodiment of the invention, the first magnetometer head is of the type of a spin oscillator of subatomic particles (atomic nuclei, electrons) and therefore delivers an electromotive force at the Larmor frequency of the spins in the magnetic field of said first area, where these spins are located, whereas the second head comprises an input coil in series with a resistor having an impedance much higher than that of said input coil, an output coil in parallel with a capacitor so as to constitute therewith a resonant circuit tuned to a frequency close to said resonance frequency, these two coils being normally decoupled electrically and a system of spins of subatomic particles coupling said output coil with said input coil at the Larmor frequency of said system of spins in the magnetic field in said second area where the system of spins is located, which frequency constitutes said resonance frequency.

Concerning the determination of the phase shift between said first and said second electromotive force, the gradiometer may include, as means for determining the phase shift: a pair of means for the rectangular shaping of the two electromotive forces normally in phase difference of 180° with each other, a pair of means for differentiating the two electromotive forces thus shaped, a pair of means for keeping, in the two succession of pulses thus obtained by differentiation, only the pulses of a given polarity, the same for both successions, a bistable trigger circuit receiving the pulses thus kept and shifting from one stable condition to the other whenever such a pulse is received, an integrator integrating the voltage steps delivered by said trigger circuit and means for measuring the voltage at the output of the integrator, which voltage is proportional to the phase shift to be determined.

The invention is more especially adapted to be used in connection with magnetometer heads making use of the Overhauser-Abragam effect such as described in the U.S. Patent No. 3,049,661, filed Apr. 1, 1958, issued on Aug. 14, 1962, for increasing the intensity of the resonance signal by bringing into play in the two magnetometer heads both nuclear spins and electronic spins, saturation of the electronic resonance line (by an electromagnetic radiation at the electronic resonance frequency) increasing the intensity of the nuclear spin resonance signal.

A preferred embodiment of the present invention will be hereinafter described with reference to the appended drawings, given merely by way of example, and in which:

FIGS. 1 and 3 illustrate the two magnetometer heads of a gradiometer according to the present invention;

FIG. 2 shows the variation of the output electromotive force amplitude with the head of FIG. 1 as a function of the frequency of the input signal;

FIG. 4 diagrammatically shows a gradiometer according to the present invention, the two heads of which are advantageously made according to FIGS. 1 and 3;

FIG. 5 illustrates the phase shift (and amplitude shift) between the input and the output of one of the heads of the gradiometer of FIG. 4, to wit, that made according to FIG. 1;

FIG. 6 diagrammatically shows an embodiment of means for measuring the phase shift between the outputs of the two heads of the gradiometer of FIG. 4.

Referring first to FIG. 1 which shows a preferred embodiment of one of the gradiometer heads making use of the Overhauser-Abragam effect, this head comprises:

An input coil 1 in series with a resistor 2 having a purely ohmic (that is to say real) impedance R much higher than the impedance $L\omega$ of coil 1 (the self inductance of which is L) at the angular frequency of operation $\omega$ ($R \gg L\omega$) whereby the voltage $U_0$ of the input sinusoidal signal applied across terminals AB is practically in phase with the current $I_0$, also sinusoidal, which flows through coil 1;

An output coil 3 mounted in shunt with a capacitor 4, which may be variable, to constitute a resonant circuit 5, coils 1 and 3 being normally decoupled electrically and possibly a resistor 6 lowering the Q factor of the resonant circuit this coil 3 being normally decoupled with respect to coil 1 (their mutual inductance coefficient being practically zero) owing, for instance, to the fact that they are disposed at right angle to each other; and A system of spins of subatomic particles (belonging to a liquid 8 contained in a vessel 7) coupling output coil 3 with input coil 1 at the frequency of resonance of this system of spins in the magnetic field where it is located, this frequency $f_0$, called Larmor frequency, being proportional to the intensity $H_0$ of this magnetic field $$f_0 = \frac{\gamma}{2\pi} H_0$$

$\gamma$ being the gyromagnetic ratio of the system of spins.

The adjustment is such that the resonance frequency $f_1$ of resonant circuit 5 is very close to $f_0$, the reduced Q factor of this circuit having for its effect to reduce the pulling effect, that is to say to prevent the resonant circuit from imposing its resonance frequency at the output of the filter which is at frequency $f_0$ as hereinafter explained with reference to FIG. 2.

Preferably, the intensity of the spin resonance signal is increased by the Overhauser-Abragam effect. Thus liquid 8 consists of a solution, in a solvent (such as water) containing the nuclear spins (in particular protons), of a paramagnetic free radical such as ditertiobutylnitroxide or nitrosodisulfonate, having an electronic resonance line of which of frequency $f_e$, which is not zero in a zero magnetic field and which is substantially the same in a zero field and in the earth magnetic field, is saturated by application of an alternating (or rotary) magnetic field at said frequency $f_e$ produced by an oscillator 9 at this frequency and a coil 10 fed from this oscillator and dipping in liquid 8. A screen (not shown) disposed about vessel 7 is permeable at the frequency of nuclear resonance $f_0$ but not permeable at the frequency of the electronic line $f_c \gg f_0$ (for instance, for an aqueous solution of nitrosodisulfonate in the earth magnetic field $f_e$=from 55 to 56 mc./s. and $f_0$=2100 c./s.).

If there is applied across the input terminals AB of the quadripole of FIG. 1 an alternative voltage $U_0$ of a frequency $f$ equal to $\omega/2\pi$, $\omega$ being the angular frequency corresponding to $f$, in such manner as to pass an alternating current of frequency $f$ and of intensity $I_0$ through coil 1, in phase with $U_0$ because $R \gg L\omega$ and if the amplitude $a$ of the voltage $U_1$ available across the output terminals CD of the quadripole is measured, by gradually increasing $f$ from a value $f_1$, much smaller than $f_0$, there is obtained the resonance curve of FIG. 2 which is a Lorenz curve.

As a matter of fact, for values very different from $f_0$, the inductive coupling between coils 1 and 3 is zero and $a$ is substantially equal to zero. When $f$ becomes close to $f_0$, a coupling through the system of spins appears between coils 1 and 3, the spins giving back to coil 3 a portion of the energy transmitted by coil 1. In other words, in the vicinity of frequency $f_0$, the system of spins plays, between the electromagnetic radiation transmitter constituted by coil 1 and the electromagnetic radiation receiver constituted by coil 3, substantially the same part as an opaque substance in the vicinity of a transparency band (for which the complex index and dielectric constant are reduced to their real portion) with respect to a light radiation.

We thus provide (FIG. 1) an electric filter with a very narrow passband (width $df$) and a very high Q factor (measured Q=6250). When $f=f_0$, $U_1$ is in phase with $U_0$ because the magnetic susceptibility which couples coils 1 and 3 together is a real number. On the contrary, when $f$ is different from $f_0$, there is some dispersion, the magnetic susceptibility becoming complex, which involves a phase shifting between $U_1$ and $U_0$, as stated hereinafter in a more detailed fashion with reference to FIG. 5.

The filter having a very narrow passband of FIG. 1 may be used in a feed back loop, as a conventional oscillating circuit:

It suffices to reinject into the input terminals AB a portion of the voltage available across the output terminals CD after amplification without phase distortion to obtain an oscillator (called spin oscillator) delivering a voltage at a frequency proportional to the intensity of the magnetic field in which the spins are located.

In FIG. 3 we have shown such a spin oscillator of a known type (as described for instance in the U.S. Patent No. 3,249,856 filed Dec. 27, 1963, issued on May 3, 1966).

In FIG. 3, $T_0$ represents the filter $T_2$ of FIG. 1 (the elements of FIG. 3 corresponding to those of FIG. 1 being designated by the same reference numerals but followed by letter $a$). However there is the following difference, in order to ensure a better electric decoupling between the input coil and the output coil in the absence of the coupling produced by the spins. The input coil is divided into two portions $1a$ and $1b$, the middle point $B_1$ being grounded and the whole of $1a$–$1b$ is fed through a balancing potentiometer $2b$, $2c$.

We have at $11a$ the amplifier without phase shift the input of which is connected with the output E, F of filter $T_0$ and the output of which is connected with the output terminals $E_1$, $F_1$ of the oscillator. Part of the output from amplifier $11a$ is reinjected through conductor 12 to the input $A_1$ of filter $T_0$, the other input $B_1$ of which is (as already stated) grounded exactly as outputs F and $F_1$.

If $g$ is the gain of amplifier $11a$ and $z$ is the transfer impedance of filter $T_0$ it suffices to have $gz \geq 1$ to obtain that the oscillator of FIG. 3 delivers a sinusoidal electromotive force $U_2$ independent of the quality of oscillating circuit $5a$, the Q factor being therefore possibly reduced to about 6 by resistor $6a$ which causes a very greatly reduced pulling within a band of intensities of the magnetic field of the order of 1000 gammas or 0.1 oersted.

Amplifier $11a$ is controlled by the effect of the magnetic resonance of the spins (in particular of the protons) of liquid $8a$ (similar to liquid 8 in the case where filter $T_2$ and oscillator $T_1$ are used in the same gradiometer according to FIG. 4), because the curve representing the transfer through the filter (output voltage as a function of the input voltage) cannot be represented by a linear equation but by a Van de Pol equation.

In FIG. 4 we have diagrammatically illustrated a gradiometer according to the present invention which comprises in combination:

A first magnetometer head $T_1$ consisting, in the preferred embodiment, of a spin oscillator of the type illustrated by FIG. 3 (with a filter $T_0$), delivered at $E_1$, $F_1$ a substantially sinusoidal first electromotive force $U_2$ of a frequency proportional to the intensity $H_1$ of the magnetic field in the first area where said head $T_1$ is to be located;

A second magnetometer head $T_2$ forming a nuclear filter (that of FIG. 1 in this embodiment) which delivers between C and D, in response to an input sinusoidal signal $U_0$ of variable frequency, a second electromotive force $U_3$ the amplitude $a$ of which varies, in response to the frequency of the input signal, according to a resonance or Lorenz curve (to wit that shown by FIG. 2) centered on its resonance frequency, this resonance frequency being, as above stated, proportional to the intensity $H_2$ of the magnetic field in the second area (where said second head $T_2$ is located);

Means, such as electric conductors $12a$, for injecting a portion of the first electromotive force $U_2$ delivered by the first head $T_1$ into the input AB of the second head $T_2$, in such manner as to constitute said input signal $U_0$; and Means for determining the phase shift $p$ between said first and said second electromotive forces, this phase shift being proportional to the magnetic field gradient between said first area and said second area.

Advantageously, we further provide an amplifier 11 whereby the (amplified) output $U_3$ of head $T_2$ and the output $U_2$ (as available on leads $12a$) of head $T_1$ have substantially the same amplitude. Measurement of the phase shift $p$ between $U_2$ and $U_3$ takes place in a device 13 the output of which is connected to a sensitiveness switch 14 the output of which is connected to a recording apparatus 15 such as a recording galvanometer.

FIG. 5 shows the variation of the phase shift $p$ as a function of the frequency $f$ of signal $U_0$ entering head $T_2$, in relation to the resonance curve giving the amplitude $a$ of output signal $U_1$ also as a function of $f$. When $f$ reaches $f_1$ (frequency in field $H_1$) and the latter is equal to $f_0$ (resonance frequency of the system of spins in the magnetic field of intensity $H_2$ supposed equal to $H_0$) amplitude $a$ is maximum (value $m$) and the phase shift between input $U_0$ and output $U_1$, and consequently between $U_2$ and $U_3$ is zero. Consequently the phase shift between $U_2$ and $U_3$ is zero when the magnetic field has exactly the same intensity in the first area and in the second area, that is to say when $H_1$ is equal to $H_2$. Then apparatus 15 records a value equal to zero. As soon as a field gradient appears between the first and second areas, that is to say as soon as $H_2$ is different from $H_1$, a phase shift $p$ appears between $U_0$ and $U_1$, therefore between $U_2$ and $U_3$.

Variation of this phase shift being illustrated by the lower curve of FIG. 5 where, for a variation of $f$ equal to $df$, phase $p$ shifts between $-pm$ and $+pm$. In the embodiment described in detailed fashion, the phase shift is equal to $\pi/2$ for a variation of 15 gammas ($1\gamma = 10^{-5}$ oersted) from the magnetic field intensity corresponding to $f_0$, whereby the apparatus is very sensitive.

In FIG. 6 we have shown a preferred embodiment of the means for measuring the phase shift $p$ between $U_2$ and $U_3$.

We first produce a phase shift of 180° of one of the signals, $U_2$ or $U_3$, in such manner as to obtain two signals $Ja$, $Jb$ with a phase shift of 180° between them if the phase shift $p$ between $U_2$ and $U_3$ is zero. The means for determining the phase shift then further comprise:

A pair of means for shaping into rectangular form the curves representative of the two electromotive forces $Ja$ and $Jb$, each of said means being advantageous constituted by a Schmidt trigger circuit 16a, 16b for $Ja$ and $Jb$ respectively, delivering $Ka$ and $Kb$, respectively.

A pair of means for differentiating the two electromotive forces $Ka$, $Kb$ thus shaped, said means consisting each of, for instance, a capacitor 17a, 17b in series and a resistor 18a, 18b in shunt;

A pair of means for keeping, in the two successions of pulses thus obtained by differentiation, only the pulses $La$, $Lb$ of a given polarity, the same for both successions of signals, to wit for instance, the positive polarity (as illustrated), these means being advantageously constituted by two diodes 19a, 20a for one of the pairs and 19b, 20b for the other pair;

A bistable trigger circuit 21 receiving said pulses $La$, $Lb$ and shifting from one stable condition to the other upon reception of every pulse $La$ or $Lb$, thus delivering a voltage M with rectangular steps alternately positive and negative;

An integrator 22 integrating the output voltage M of said trigger circuit; and

Means 15 for measuring the voltage at the output of integrator 22, which is proportional to the phase shift to be determined.

As a matter of fact, if the phase shift $p$ between electromotive forces $U_2$ and $U_3$ is zero, the phase shift between electromotive forces $Ja$ and $Jb$ is equal to 180°. It is this case which has been illustrated for the signals of FIG. 6. Then, signals $Ka$ and $Kb$ are also at 180° to each other and pulses $Lb$ are positioned between pulses $La$, the leading edges of pulses $Lb$ being located at the middle of the interval between two leading edges of pulses $La$. The bistable trigger circuit remains for the same time in each condition and signal M comprises positive and negative alterations which are equal to one another. As soon as a phase shift $p$ appears between $U_2$ and $U_3$, signals $Ja$ and $Jb$ are no longer in phase shift of 180° and the leading edges of pulses $Lb$ are offset, according to the sign of $p$, toward the preceding of following pulse $La$. Trigger circuit 21 remains for a longer time in one of its conditions than in the other and signal M includes alterations of one polarity longer than the alterations of the other polarity.

Integrator 22 delivers the mean value of signal M, which is zero when $p=0$ but which increases in absolute value together with $p$ when the latter is different from zero, the sign of this means signal depending upon the sign of $p$.

In the embodiment shown by the drawings, the voltage delivered by integrator 22 passes from 0 to 10 volts for a phase shift $p$ increasing from 0 to $\pi/2$ that is to say for a gradient between the first area and the second area increasing from 0 to $15\gamma$. As the electromagnetic background noise does not exceed 1 millivolt, it would be possible to appreciate with this apparatus a gradient of $$1.5 \times 10^{-3} \gamma$$

This sensitiveness is much too great for the measurements that are generally to be performed. In these conditions we may insert, between integrator 22 and recorder 15, an attenuator 14 limiting the sensitiveness to $0.01\gamma$. The output voltage of attenuator 14 may be recorded or read on a conventional galvanometer 15, attenuator 14 having for instance three different sensitivenesses, to wit:

$1\gamma$ for the whole scale;
$2\gamma$ for the whole scale;
$5\gamma$ for the whole scale.

We may provide means for varying the distance between heads $T_1$ and $T_2$ according to either the use for which the apparatus is intended or the state of the ground. For instance, heads $T_1$ and $T_2$ may be enclosed in a tubular support of a plastic material wherein they are movable longitudinally and adapted to be fixed in position, the usual distance between the two heads being for instance 80 cms.

It is possible, with such an apparatus, to observe and to measure variations of the order of $0.01\gamma$, that is to say 0.1 microoersted, the variations of the magnetic field intensity being recorded and indicating the general form of the disturbances, for instance for prospecting purposes, by determining the anomalities of the magnetic field.

It will be noted that it will be possible to provide on the apparatus of FIG. 4 an output merely branched at $E_1$, $F_1$, this output giving in a frequency meter the intensity of magnetic field $H_1$. In this case, the apparatus may work both as magnetometer and as gradiometer. A particular application of such an apparatus is given in U.S. Patent Ser. No. 3,441,841.

A complete gradiometer, making use of transistors, according to the embodiment described with reference to FIGS. 1, 3, 4 and 6 has a consumption of 0.4 ampere with a voltage of 28 volts, that is to say about 12 watts, a single oscillator replacing the two oscillators 9 and 9a for feeding the coil 10 of head $T_2$ of the coil 10a of head $T_1$.

A magnetic gradiometer according to this invention has over known magnetic gradiometers many advantages and in particular the following ones.

First it permits of measuring the magnetic field gradients with a very high precision, of the order of 1 tenth of microoersted.

It may permit of determining also the absolute value of the magnetic field at one point.

It is constituted by a portable apparatus of very low consumption.

What we claim is:

1. A magnetic gradiometer for measuring the difference between the respective magnetic field intensities in a first and in a second area which comprises in combination:

a first magnetometer head located in said first area for supplying a first substantially sinusoidal electromotive force of a frequency proportional to the magnetic field intensity in said first area, said first magnetometer head being of the subatomic particle spin oscillator type, having an output delivering said first substantially sinusoidal electromotive force at the Larmor frequency of the spins in the magnetic field in said first area wherein said spins are located;

a second magnetometer head located in said second area, said second magnetometer head having an input, connected to said output of the first magnetometer head, and an output, said second head constituting a nuclear filter for delivering at its output, in response to a variable frequency input sinusoidal signal, a second electromotive force of an amplitude varying, in response to variations of the frequency of the input signal, according to a resonance, or Lorenz, curve centered on its resonance frequency, said resonance frequency being proportional to the magnetic field intensity in said second area, said second magnetometer head comprising,
- an input coil,
- a resistor in series with said input coil,
- said input coil and resistor being connected in series across the input,
- said resistor having an impedance much greater than that of said input coil,
- an output coil,
- a capacitor connected in parallel with said output coil to form therewith a resonant circuit, the resonance frequency of said resonant circuit being close to the resonance frequency which is proportional to the magnetic field intensity in said second area,
- said output coil and said capacitor being connected across said output,
- said two coils being normally electrically decoupled, and
- a system of subatomic particle spins indentical to the spins of said first magnetometer head in said second area for coupling said output coil with said input coil at the Larmor frequency of said system in the magnetic field of said second area, which Larmor frequency is the resonance frequency which is proportional to the magnetic field intensity in said second area;

means for injecting a portion of said first electromotive force from said first magnetometer head to the input of said second magnetometer head to constitute the input signal of said second head; and means connected to the outputs of said first and second magnetometer heads for measuring the phase shift between said first and second electromotive forces, this phase shift being proportional to the difference between the respective magnetic field intensities in said first and said second areas.

References Cited

UNITED STATES PATENTS

| | | | |
|---|---|---|---|
| 3,085,196 | 4/1963 | Martin | 324—0.5 |
| 3,145,336 | 8/1964 | Bonnet | 324—0.5 |
| 3,222,593 | 12/1965 | Denis | 324—0.5 |
| 3,249,856 | 5/1966 | Lemaire | 324—0.5 |
| 3,274,485 | 9/1966 | Denis | 324—0.5 |
| 3,021,481 | 2/1962 | Kalmus | 324—83 |

RUDOLPH V. ROLINEC, Primary Examiner

M. J. LYNCH, Assistant Examiner